United States Patent [19]
Wehmeyer

[11] Patent Number: 4,715,474
[45] Date of Patent: Dec. 29, 1987

[54] SCAFFOLD SYSTEM

[76] Inventor: Donald T. Wehmeyer, 19026 - 171 Pl. NE., Woodinville, Wash. 98072

[21] Appl. No.: 885,945

[22] Filed: Jul. 14, 1986

[51] Int. Cl.$^4$ .................................................. E06C 7/50
[52] U.S. Cl. ...................................... 182/194; 182/46; 182/228; 403/268
[58] Field of Search ................. 182/228, 46, 194, 179, 182/178; 403/265, 267, 268, 174, 169

[56] References Cited

U.S. PATENT DOCUMENTS

| | | | |
|---|---|---|---|
| 119,232 | 9/1871 | Jones | 403/268 |
| 2,755,981 | 7/1956 | Edwards | 403/174 |
| 2,760,707 | 8/1956 | Anderson | 182/179 |
| 2,941,616 | 6/1960 | Grover | 182/179 |
| 3,009,532 | 11/1961 | Richard | 182/46 |
| 3,454,131 | 7/1969 | Johnson | 182/178 |
| 4,353,661 | 10/1982 | Ruther | 403/174 |

FOREIGN PATENT DOCUMENTS

| | | | |
|---|---|---|---|
| 140984 | 5/1985 | European Pat. Off. | 182/228 |
| 2,509,357 | 4/1974 | Fed. Rep. of Germany | 403/265 |
| 2,012,649 | 8/1979 | United Kingdom | 403/267 |

Primary Examiner—Reinaldo P. Machado
Attorney, Agent, or Firm—Seed and Berry

[57] ABSTRACT

A portable scaffold having tubular structural elements has necked fittings extending into the ends of the tubular elements and attached thereto by adhesive which is introduced through an entry port preferably provided by a porting ring sleeved on the neck of each fitting and opposed by an O-ring. The adhesive flows from the entry port through longitudinal and circumferential grooves in the neck between the porting ring and O-ring and vents through a vent port in the porting ring.

30 Claims, 11 Drawing Figures

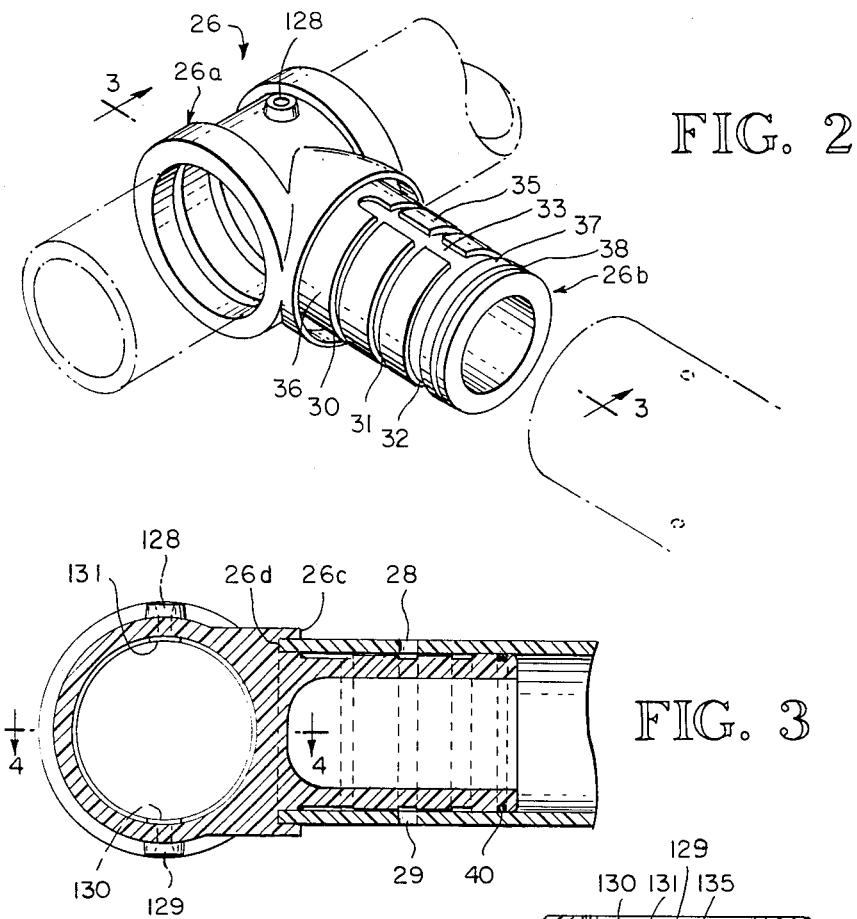
FIG. 2
FIG. 3
FIG. 4
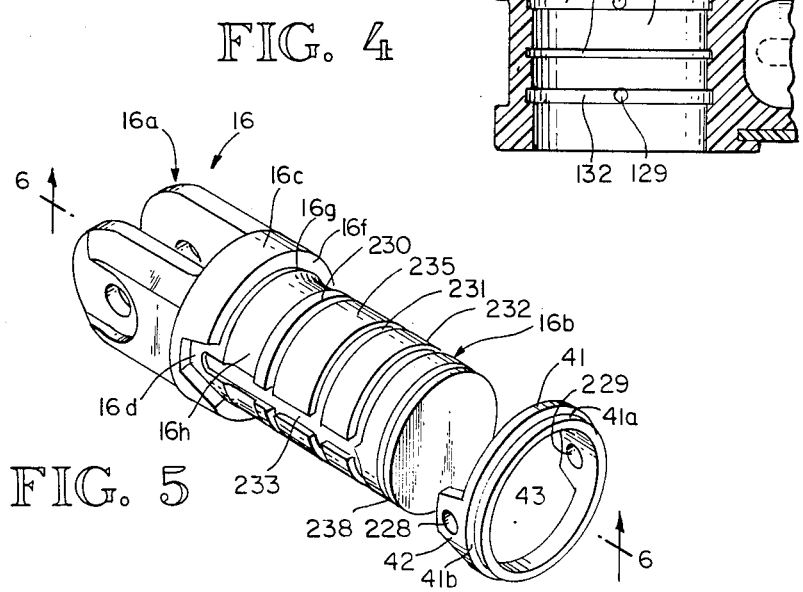
FIG. 5

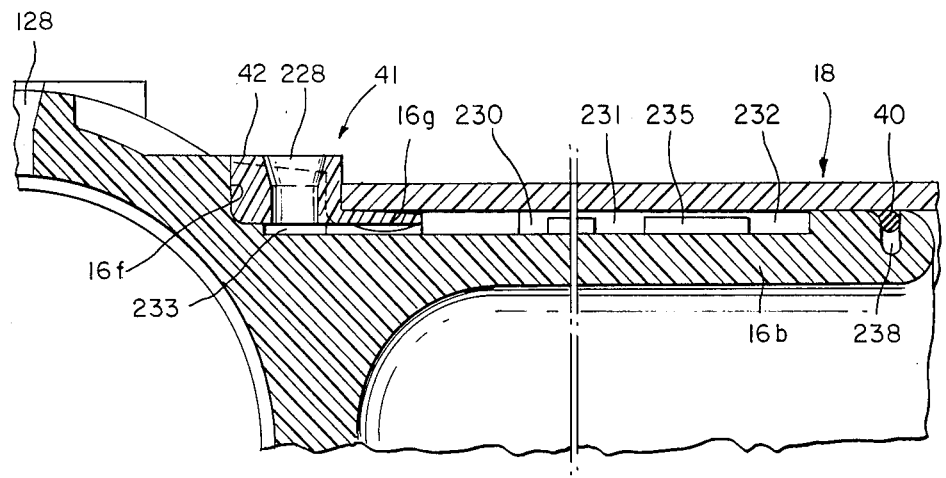
FIG. 6
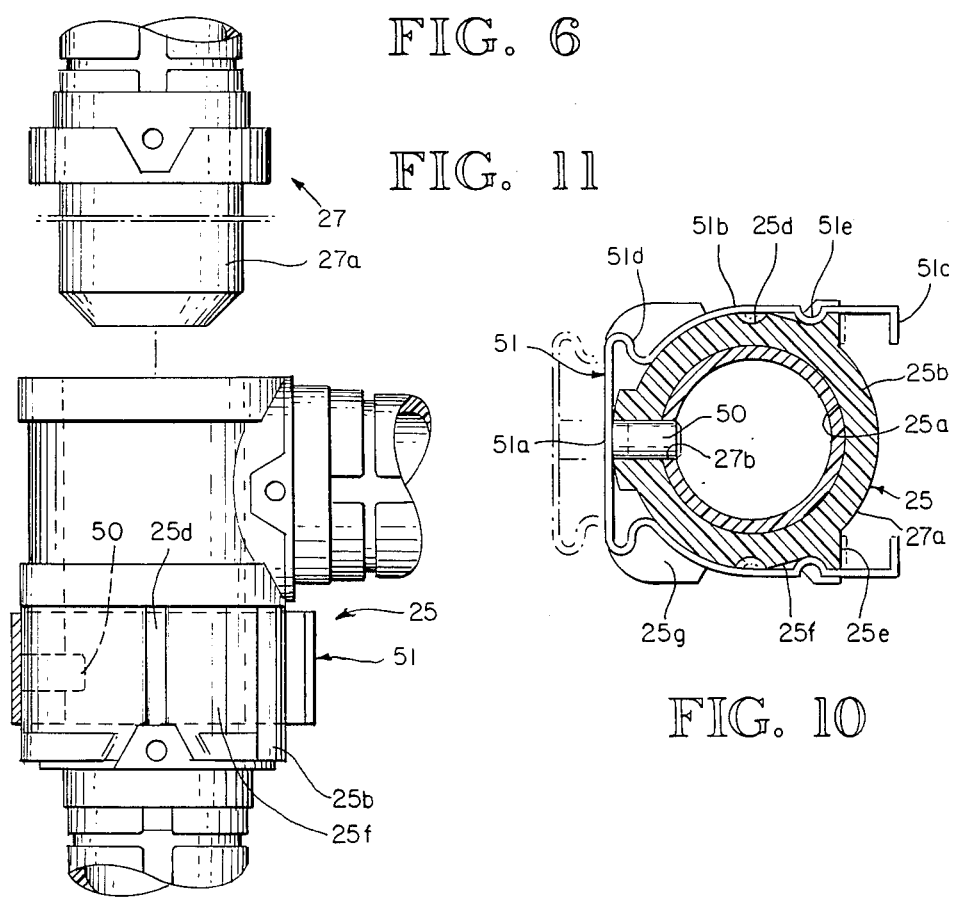
FIG. 11
FIG. 10

SCAFFOLD SYSTEM

TECHNICAL FIELD

The present invention relates to portable scaffolds of the type in which ladder sections are connected by folding or detachable braces, or by detachable work platforms.

BACKGROUND ART

The ladder sections of portable scaffolds have normally been constructed from metal members, often aluminum tubes, which are welded, riveted, bolted or otherwise fastened at their joints. Metal scaffolds present a danger to workers thereon who are using electric tools or working with or adjacent electric wiring. This danger can be reduced if the support members are plastic, particularly those adjacent the ground. However, the durability, it is preferred to have the rungs of the ladder sections made of aluminum tubes in locations where they will frequently be engaged by snap hooks or the hooks on the ends of work platforms.

Use of plastic tubes for the support rails or posts and braces requires special fittings to connect with the rails and other parts, particularly if adhesive is to be used rather than fasteners.

DISCLOSURE OF THE INVENTION

The present invention aims to provide a practical, reliable system utilizing injection-molded plastic fittings and plastic tubular support members which can be easily assembled to make a scaffold or other structure with adhesive connections, and by which metal tubular members can also be used at will.

In carrying out the present invention, injection-molded plastic fittings are provided which have a rigid neck adapted to fit within a tubular member and receive adhesive which is confined within a central circumferential recessed area to bond the neck to the tubular member. This central area connects by longitudinal grooves to radial ports which may be formed in the tubular members, but preferably are provided in an injection-molded plastic porting ring which is force-fitted onto the neck and bears against the head of the fitting. This head is preferably recessed to receive two ears extending from the porting ring, and these ears have inlet and vent ports which register with the longitudinal grooves extending into the recessed central area. Near its outer end the neck has a circumferential groove to receive a sealing ring. The neck is recessed adjoining the head of the fitting so that an annular portion of the porting ring can be flush with circumferential land portions at the ends of the central recessed area so that the tubular member can fit snugly over the neck and the porting ring.

The head of the fitting providing the neck can take any desired form such, for example, as a snap-hook or clevis or a sleeve to fit over a tubular rail or post. In the latter instance, the sleeve is preferably internally recessed for adhesive administered and vented through radial ports.

BRIEF DESCRIPTION OF THE DRAWINGS

In the accompanying drawings:

FIG. 2 is a perspective view of a T-fitting made in accordance with one embodiment of the invention;

FIG. 3 is a sectional view taken as indicated by line 3—3 in FIG. 2 and with a tubular member telescoped onto the neck portion of the T-fitting;

FIG. 4 is a sectional view taken along line 4—4 of FIG. 3;

FIG. 5 is a perspective exploded view of a second fitting assembly made in accordance with the invention and including a porting ring;

FIG. 6 is a detailed fragmentary sectional view to an enlarged scale taken similarly to FIG. 3, but showing the second embodiment of the invention using a porting ring.

FIG. 10 is a sectional view taken as indicated in FIG. 1 by line 10—10; and

FIG. 11 is an exploded elevational view of the fittings used to connect an upward extension of the scaffold.

BEST MODE FOR CARRYING OUT THE INVENTION

Figure 1:
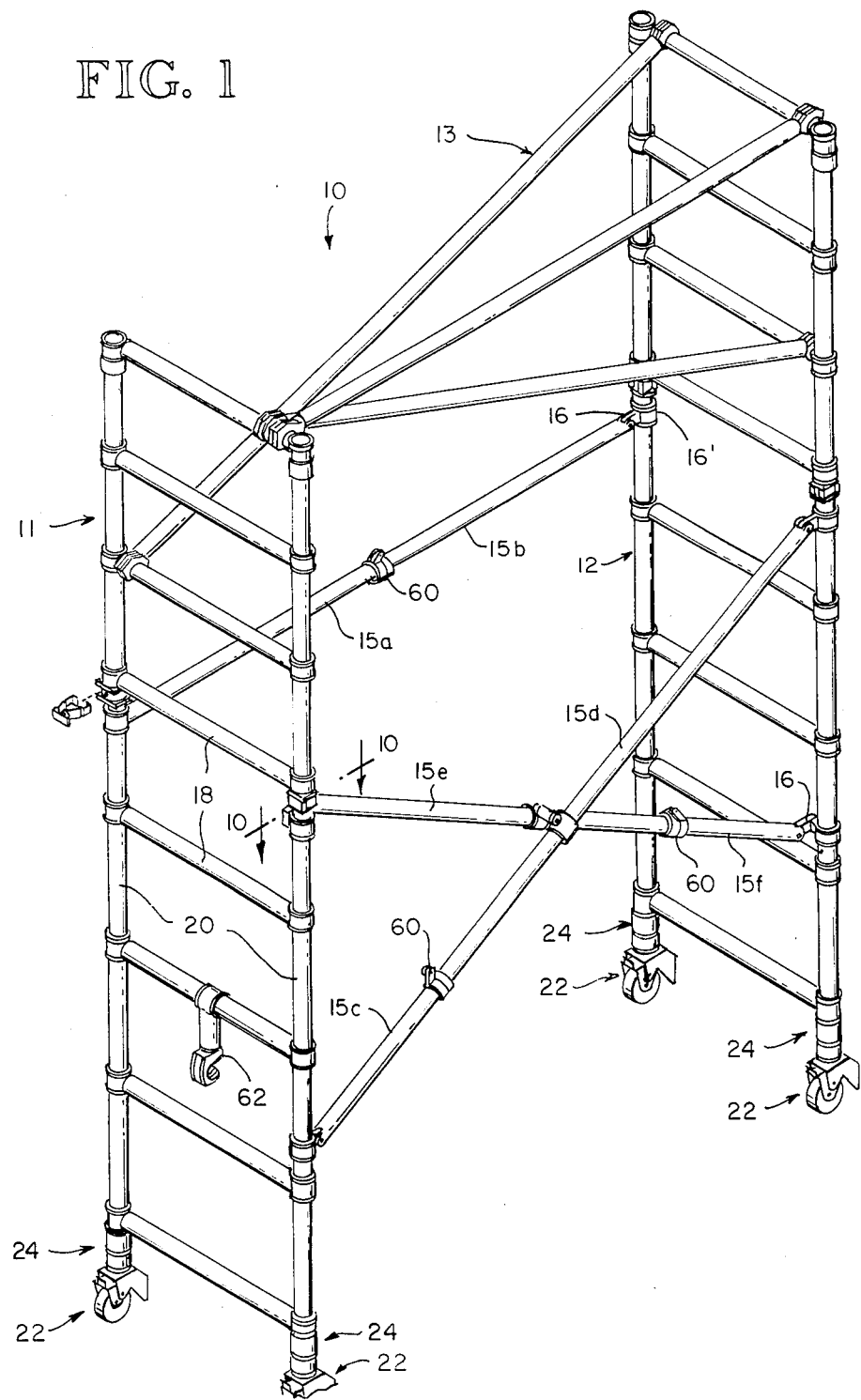
FIG. 1 is a perspective view of a portable scaffold embodying the present invention.

A typical scaffold 10 embodying the present invention is illustrated in FIG. 1 and comprises a pair of ladder sections 11-12 connected together by various brace sections 15a-f with articulated braces 15 having clevises 16 pivotally connected to the ladder sections. The scaffold 10 may have ladder extensions 11a-12a which plug into the upper ends of the ladder sections 11-12 and are connected together by various lengths of detachable braces 13 having snap hooks 14 at their ends. Each ladder section 11-12 has rungs 18 extending between a pair of support rails or posts 20 which project downwardly as legs beyond the bottom rung and connect to caster assemblies 22 having externally threaded tubular extensions telescoping into the support rails 20. The telescopic interfit between the support rails 20 and the tubular extensions from the caster assemblies 22 is secured and adjusted by quick-disconnect fittings 24 which provide for coarse and fine adjustments.

In accordance with the present invention, the rails 20 preferably have glass fiber-reinforced plastic tubular construction for safety to provide adequate column strength and electric insulation, and the rungs 18 are preferably aluminum tubes in locations where frequent engagement by snap hooks 14 or hooks at the ends of work platforms is expected. The rails 20 are continuous and extend through T-fittings 26 having sleeve portions 26a receiving the rails therethrough and central neck portions 26b extending into the ends of the rungs 18. At their upper ends the rails 20 have modified T-fittings 25 which present a socket 25a at their upper end for receiving a male extension 27a from the lower ends of a fitting 27 provided at the lower end of the rails 20a of the ladder extensions 11a-12a. At their upper ends the ladder extensions 11a-12a are also provided with the modified T-fittings 25 so that additional of the ladder extensions can be used to increase the scaffold height.

As part of this invention, the T-fittings 26 are secured to the rungs 18 and rails 20 by a suitable adhesive injected after assembly through inlet ports 28 and 128, and injection is terminated when the adhesive is seen to flow out through outlet ports 29 and 129. A suitable hot-melt urethane adhesive is preferred. The inlet and outlet ports may be provided by boring holes through the rungs 18 or by using ported rings 41 sleeved on the neck portions 26b of the T-fittings to seal between the ends of the rungs 18 and annular abutment shoulders 26c at the root ends of the neck portions 16b. The first of the adhesive application arrangements is illustrated in FIGS. 2 and 3, and the second is best seen in FIGS. 5 and 6.

Referring to FIG. 2, it is seen that the neck portion 26b has a groove-and-land pattern comprising three circumferential grooves 30, 31 and 32 intersected by two diametrically opposite, longitudinal grooves 33, 34. It is preferred that the grooves 30–32 be progressively wider; i.e., groove 31 is wider than groove 30 and groove 32 is wider than groove 31. This is done so that the resistance to adhesive flow during application of the adhesive will be less at groove 31 than groove 30, and will be less at groove 32 than at groove 31. The longitudinal grooves 33–34 are of sufficient width and depth to prevent retarding of flow between the circumferential grooves 30–32. Surrounded by the circumferential and longitudinal grooves are four lands 35 which preferably have a reduced outer diameter relative to the outside diameter of the root portion 36 and terminal portion 37 which adjoin the grooves 30 and 32, respectively. This reduced outer diameter provides clearance for adhesive to pass between the lands 35 and the inside wall of a rung 18 fitted onto the neck portion 18b. An undercut groove 26d may be formed in the shoulder 26c to interfit with the end of the rung 18.

It is also preferred to form a narrow circumferential groove 38 in the terminal portion 37 of the neck portion 26b of the T-fitting to receive an O-ring 40 for sealing against flow of adhesive beyond the free end of the neck portion 26b. The O-ring 40 is preferably a thin flexible plastic ring which is narrower than the groove 38 so that when a rung 18 is moved endwise onto the neck portion 26b, it bends the outer portion of the O-ring inwardly in the direction of the shoulder 26c and keeps in contact with the inside wall of the rung 18 as the run is moved into engagement with the shoulder groove 26d.

The inlet and outlet ports 28, 29 can be bored in the rungs 18, in which case it is preferred to locate the ports at the intersections of the center groove 31 and the longitudinal grooves 33, 34. When adhesive is injected through the inlet port 28, it fills the five grooves 30–34 and covers the four lands 35 so as to firmly connect the rung 18 to the T-fitting 26. Appearance of adhesive at the outlet port 29 indicates to the applicator that sufficient adhesive has been introduced. It is important to note that by filling the five grooves 30–34, the adhesive actually keys itself to the neck of the T-fitting and does not depend upon bonding to the T-fitting for connecting the rung 18 thereto. To assist in adhesion of the adhesive to the inside face of the rung 18, it is preferred to roughen or score the surface where it will be contacted by the adhesive.

Referring to FIG. 4, it is seen that the inside wall of the sleeve portion 26a of the T-fitting is formed with three circumferential grooves 130, 131 and 132. The two circumferential lands 135 between the grooves 130–132 are preferably larger in radius than the radius of the inside face of the sleeve portion 26a between the grooves 130, 132 and the ends of the sleeve portion 26a. Inlet port 128 is formed in the sleeve portion 26a to intersect the central groove 131 and a pair of outlet ports 129 are provided to intersect the outer grooves 130, 132 at locations diametrically opposite the inlet port 128.

When a T-fitting 18 is in the desired location sleeved on a rail 20, adhesive, such as a hot-melt urethane, is injected through the inlet port 128 and continued until adhesive appears in the outlet ports 129. By that time, the three grooves 130–132 are normally filled with adhesive and the surface of the two lands 135 is substantially covered, thereby firmly connecting the T-fitting 18 to the rail 20 in the selected position. In this regard, it is preferred to roughen the outer surface of the rails 20 in the areas to be contacted with the adhesive for better bonding. As in the case of the grooves 30–35, the three grooves 130–132 give a keying effect.

For purposes of example, in FIGS. 5-6 the neck 16b on a U-shaped component 16a of a clevis fitting 16 is shown with an alternative adhesive application arrangement which is preferred in most instances over that previously described because it is preferred not to have to bore inlet and outlet ports in the tubular member being bonded to the fitting preparatory to application of the adhesive. In this alternative arrangement, a porting ring 40 is provided having an L-shaped cross-section defined by a ring portion 41a and an annular flange portion 41b with a pair of ears 42, 43 projecting therefrom longitudinally. The annular base 16c of the clevis portion 16a of the fitting 16 has a pair of recesses 16d, 16e matching the ears 42, 43 and joins at a shoulder 16f with a neck extension.

As in the case of the neck portion 26b of the T-fitting 26, the neck 16b is formed with three circumferential grooves 231, 232 and 233, and a terminal groove 238 for an O-ring 40. The three circumferential grooves are intersected by a pair of longitudinal grooves 233, 234 which extend beyond the groove 230 into the recesses 16d, 16e so as to register with inlet and outlet ports 228, 229 formed in the ears 40, 41 when the porting ring 41 is sleeved onto the neck 16b until the ears 40, 41 occupy the recesses 16d, 16e and the porting ring abuts the shoulder 16f. As in the case of the lands 35, the four lands 235 outlined by the grooves 230–234 are slightly recessed relative to the adjacent non-grooved portions of the neck 16b. However, a circumferential portion 16g of the neck 16b, adjoining the shoulder 16f, is also preferably recessed slightly so that the main body of the porting ring 41 can fit therein and have the outer face of its ring portion 41a substantially flush with that of the adjoining portion 16h of the neck 16b.

The porting ring 41 is preferably injection molded from a suitable polypropylene material so as to have sufficient flexibility and stretch to be inserted endwise over the larger portions of the neck 16b and fit into the recessed portion 16g. With the porting ring 41 and O-ring 40 in position on the neck 16b, the tubular brace 13 can be sleeved onto the neck 16b until it abuts the annular flange portion 41b of the porting ring 41. Adhesive can then be applied through the inlet port 228 from which it will flow through the longitudinal groove 233 and fill the remaining of the grooves 230–234 and substantially cover the four lands 235 before appearing at the discharge port 229. During this adhesive application, the O-ring 40 and porting ring 41 substantially confine the adhesive within the desired application area.

The complementing portion 16' of the clevis is sleeved on a rail 20 and may be secured thereto in the same manner as T-fittings 26. It will be apparent that the T-fitting 26 could be modified to provide the recesses 16d, 16e and to have its neck portion 26b identical to the neck 16b so as to receive the porting ring 41, thereby eliminating the need to provide the ports 28, 29 in the rung 18.

Figure 7:
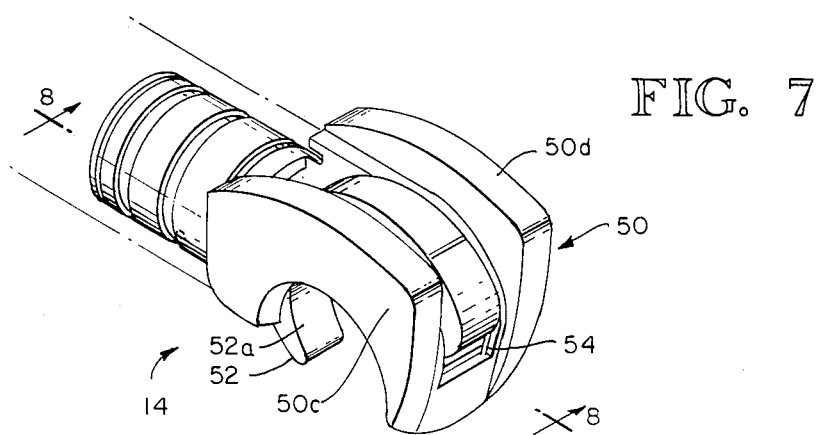
FIG. 7 is a perspective view of a snap-hook connected to a tubular member and embodying the first form of the invention.
Figure 8:
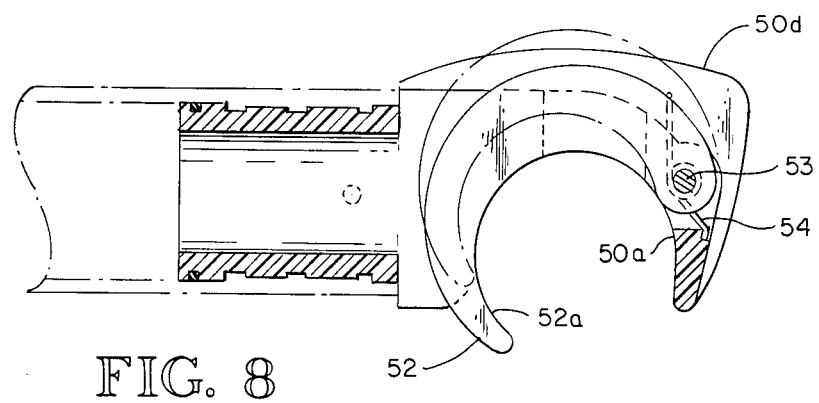
FIG. 8 is a sectional view taken along the line 8—8 of FIG. 7.
Figure 9:
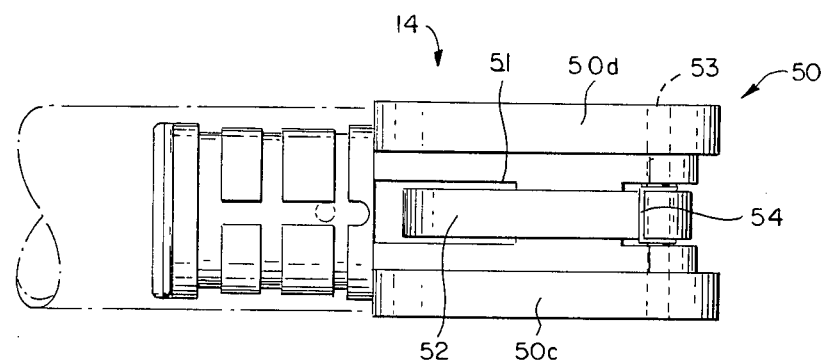
FIG. 9 is a plan view of the snap-hook.

Directing attention to FIGS. 6–8, the invention has been applied to a snap hook 14 as a further example. The snap hook has a generally C-shaped body 50 formed with a central cutout 51 to receive a hook-shaped keeper 52 which is pivotally mounted on a cross-pin 53. The keeper 52 is biased by a spring 54 into a locking position (FIG. 2) whereat the curved tip portion 52a of the keeper 52 together with the concave jaw face 50a of the body 50 encompass more than 180 degrees. It will be noted that the hook body 50 has a pair of guard flanges 50c, 50d at the back which protect the keeper 52 if the snap hook 14 is dropped on its nose.

The body of the snap hook 14 is formed with a neck 50b matching the neck 16b and may have its sides recessed to provide recesses like recess 16d to receive the ears on a porting ring 41 when such is to be used in preference to porting the braces 13.

Although the porting ring 41 is shown as L-shaped, it may be U-shaped in cross-section to provide a cover lip functioning in the same manner as lip 26c to cover an end portion of the associated tubular member.

It is preferred to use aluminum tubes with external longitudinal ribbing for the rungs 18 and roughen or score the exterior surface of the end portions of the tubular aluminum rungs where they fit over the necks of the T-fittings as by providing a criss-crossing pattern of fine threads provided, for example, by cutting right-hand threads when the cutting tool is advancing into the rung and cutting lefthand threads as the cutting tool is retracting. This scored rung surface in combination with the grooves in the neck of the T-fittings gives a mechanical interlock with the adhesive which is bonding the rung and neck together. Similarly, as previously mentioned, it is preferred to buff the support rails of the ladder sections where they interfit with the T-fittings to give a roughened surface and a surface of reduced diameter where the adhesive is applied to thereby give a mechanical interlock as well as bonding.

As previously mentioned, the T-fittings 25 at the upper end of the ladder sections 11-12 have sockets 25a at their upper ends to receive male extensions 27a projecting downwardly from fittings 27 secured in the lower ends of the rails 11a of the ladder extensions 11a-12a. The upper end of each fitting 27 is like the clevis fitting 16; i.e., the male extension 27a is substituted for the clevis head 16a. Referring to FIGS. 10-11, a hollow male extension 27a is shown fitting into the socket 25a of one of the T-fittings 25. The male extension 27a is tapered at its lower end to engage and retract a locking pin 50 until the pin registers with a radial hole 27b in the male extension. The pin 50 is then urged inwardly into locking position with the hold 27b by a generally U-shaped spring clip 51 on the flat central section 51a of which the outer end of the pin 50 is mounted. The spring clip 51 has two opposed spring arms which grasp a central section 25b of the T-fitting 25 into which the socket 25a depends. Beneath the central section 25b the T-fitting has a grooved neck like that shown on the fitting 16 in FIG. 4 extending downwardly to fit into the upper end of a rail 11 for an adhesive connection thereto, and above the central section 25b the T-fitting 25 has a boss section 25c providing the upper portion of the socket 25a. Extending at right angles from the boss section 25c is a second grooved neck like that shown on the fitting 16 in FIG. 4 to fit into the end of a rail 18. The U-clip 51 has a pair of spring arms 51b which grip the outer face of the central section 25b and terminate with inturned retaining fingers 51c. Each spring arm 51b has an S-shaped spring section 51d adjoining the central section 51a and has an intermediate catch loop 51e for fitting within a vertical catch groove 25d in the central section 25b when the pin is manually retracted preparatory to removing the ladder extensions 11a–11b. When the pin 50 is retracted, the retaining fingers 51c engage stop faces 25e to prevent the clip 51 from being separated from the T-fitting 25 and misplaced or lost.

Preferably the central section 25b has inwardly sloped ramps 25f between the catch grooved 25d and the stop faces 25e, and the length of the pin 50 is such that when it is fully retracted from within the socket 25a the catch loops 25d engage ramps 25f without reaching the catch grooves 25d. By this arrangement, the pins 50 retract automatically when engaged by the tapered end portions of the male extensions 27a of the T-fittings 27 on the extension ladder sections 11a–11b when the latter are lowered into registering engagement with the ladders 11–12, and then tend to spring back toward locking engagement within the holes 27b in the male extension.

It is preferred that for safety reasons the person erecting the scaffold not depend entirely upon the return spring effect of the U-clip 51 and double-check by manually pushing inwardly upon all of the central portions 51a of the spring clips. At its lower end the central section 25b of the T-fitting 25 preferably has ribs 25g to help keep the spring clip 51 in proper position.

The scaffold bracing can include a variety of other fittings each having a neck connected by adhesive to a brace or other tubular member in the same manner as the clevis component 16, snap-hook 14, or the T-fitting 26. For example, the bracing can have complementing snap-lock hinge fittings 60 on two horizontal brace sections 15a, 15b and diagonal brace sections 15c, 15d and 154, 15f, whereby the scaffold can be collapsed with the ladder sections 11, 12 moved togehter such that a swing hook 62 on ladder section 11 can be engaged with a rung of ladder section 12 to hold the scaffold in collapsed condition.

It will be apparent that the removable braces 13 can be located at will for maximum bracing effect and that a work platform with snap hooks at its ends can be provided to be mounted on the rungs 18 at a selected height above ground level.

The T-fittings 26, clevis fittings 16 and snap hook fittings 14 are adapted to be injection molded from nylon or other suitable plastics and preferably are glass fiber-reinforced. By the present invention, these fittings and a variety of other fittings can be easily and reliably adhesive-connected to metal or plastic tubular members.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. An end fitting for a tubular member, comprising:
 a one-piece body having a head and a neck projecting to an outer end from said head, circumferential portion of reduced circumference;

a porting ring sleeved on said neck and adjoining said head, said porting ring having exposed inlet and vent ports;

inlet and vent passages connecting said inlet and vent ports with the exterior of said central portion;

said body being adapted to have a tubular member sleeved on said neck into engagement with the porting ring whereupon adhesive may be introduced through the inlet port for filling the space between said central portion and the tubular member for securing the tubular member to said neck.

2. An end fitting according to claim 1 in which said head has a pair of external recesses, and said porting ring has a pair of ear extensions occupying said recesses and having said inlet and vent ports therein.

3. An end fitting according to claim 1 in which said neck has a circumferential ring-receiving groove adjoining said head into which said porting ring fits, said porting ring being formed of a resilient material permitting the porting ring to be passed endwise along said neck from the outer end thereof into said groove.

4. An end fitting according to claim 1 in which said neck has a circumferential exposed groove adjacent said outer end, and a sealing ring fitting into said groove.

5. An end fitting according to claim 1 in which said central portion has a circumferential groove and the neck has two longitudinal grooves intersecting the circumferential groove and forming said inlet and vent passages.

6. An end fitting according to claim 1 in which said central portion has two circumferential grooves and the neck has two longitudinal grooves intersecting said circumferential grooves and forming said inlet and vent passages.

7. An end fitting according to claim 1 in which said inlet and outlet passages comprise two exterior longitudinal grooves in said neck registering with said ports and extending into said central portion.

8. An end fitting according to claim 1 in which said head has a pair of external recesses and said porting ring has a pair of ear extensions occupying said recesses and having said inlet and vent ports therein, longitudinal grooves in said body extending from within said recesses in registration with said ports along said neck into said central portion thereof to provide said inlet and vent passages.

9. An end fitting according to claim 8 in which said neck has a circumferential groove between said central portion and outer end thereof, and a sealing ring in said circumferential groove.

10. An end fitting according to claim 1 in which said head is formed as a sleeve for receiving a second tubular member, said sleeve having its axis at cross-angle to that of said neck, said sleeve having an internal central circumferential portion of increased diameter relative to the adjoining end portions of the sleeve, and said sleeve being formed with exposed inlet and vent ports extending through the sleeve into said internal central portion thereof so that adhesive may be introduced through the inlet port of the sleeve for filling the space between the central portion of the sleeve and said second tubular member.

11. An end fitting according to claim 1 in which said head comprises a sleeve for receiving another tubular member.

12. An end fitting according to claim 1 in which said head comprises a hook.

13. A ladder section for use in a scaffold having a pair of ladder sections interconnected by braces, comprising:

a parallel spaced pair of continuous plastic tubular posts;

a plurality of tubular rungs between said posts;

plastic T-fittings mounted in the ends of said rungs and sleeved on a respective one of said posts, said T-fittings having respective grooved areas surrounding said posts and surrounded by the rungs;

inlet passages to the grooved areas and vent passages from such grooved areas;

and adhesive substantially filling said inlet passages and grooved areas for connecting the T-fittings to the rails and rungs.

14. A ladder section according to claim 13 in which the inlet passages to the grooved areas surrounded by the rungs include inlet ports passing through the rungs.

15. A ladder section according to claim 13 in which the T-fittings have porting rings sleeved thereon interfitting with the ends of the rungs, said porting rings having inlet and outlet ports registering with the inlet and outlet pasages for the grooved areas surrounded by the rungs.

16. A ladder section according to claim 13 in which said T-fittings have circumferential grooves adjacent the grooved areas surrounded by the rungs, and sealing rings in said circumferential grooves and engaging the rungs.

17. An end fitting for a tubular member, comprising:

a one-piece body having a head and a round neck formed with a first circumferential groove adjoining the head for receiving a porting ring, a first circumferential land adjoining said first circumferential groove, a second circumferential land having substantially the same diameter as the first circumferential land and separated therefrom by a central circumferential area of lesser diameter for receiving adhesive, and longitudinal grooves extending across the first circumferential groove and the first circumferential land into the central circumferential area for communicating with the porting ring.

18. An end fitting according to claim 17 in which said second circumferential land has a second circumferential groove therein for receiving a sealing ring.

19. An end fitting according to claim 17 in which said central circumferential area has third and fourth circumferential grooves intersected by said longitudinal grooves.

20. An end fitting according to claim 17 in which said head has a pair of recesses adjoining said first circumferential groove and intersected by two of said longitudinal grooves for receiving ear extensions on the porting ring having inlet and venting ports therethrough to register with said two longitudinal grooves.

21. An end fitting for a tubular member, comprising:

a one-piece body having a neck projecting from an annular shoulder which is interrupted by a pair of recesses, said neck having a circumferential groove adjoining said shoulder and recess;

a porting ring sleeved on the neck in said circumferential groove and engaging said shoulder, said ring having a pair of ear extensions within said recesses which have inlet and vent ports therein; and said porting ring having an annular portion which is substantially flush with two circumferential lands on said neck whereby a tubular member can closely fit over said lands and said annular portion of the porting ring, said porting ring being formed from a flexible plastic material so that it can be press-fitted onto said neck and pass over said lands.

22. An end fitting according to claim 21 in which said two circumferential lands are separated by a circumferential area which has a diameter less than that of the lands for receiving adhesive and is intersected by longitudinal grooves extending into said recesses and registering with said ports.

23. An end fitting according to claim 22 in which the land furthest from the porting ring has a circumferential groove with a flexible plastic sealing ring therein adapted to bend lengthwise of said neck toward said head into flush relationship with such land when a tubular member is telescoped over said neck and annular portion of the porting ring.

24. An end fitting for two tubular members arranged at right angles to one another, comprising:
a one-piece body having two necks projecting therefrom at right angles to one another from respective annular shoulders, each of which is interrupted by a pair of recesses, each neck having a circumferential groove adjoining the respective shoulder and recess;
a respective porting ring sleeved on each neck in its circumferential groove and engaging the respective shoulder, said rings having respective pairs of ear extensions within said pairs of recesses which have inlet and vent ports therein; and
each porting ring having an annular portion which is substantially flush with two circumferential lands on the respective neck whereby a tubular member can closely fit over said lands and said annular portion of the porting ring, said sealing ring being formed from a flexible plastic material so that it can be press-fitted onto said neck and pass over said lands.

25. An end fitting according to claim 24 in which said end fitting has a socket aligned with one of said necks.

26. An end fitting according to claim 24 in which each end fitting has a male extension aligned with one of said necks.

27. A ladder section for use in a scaffold having a pair of ladder sections interconnected by braces, comprising:
a parallel spaced pair of continuous posts with a cylindrical exterior surface;
a plurality of tubular rungs between said posts;
plastic T-fittings mounted in the ends of said rungs and sleeved on a respective one of said posts, said T-fittings having respective grooved areas surrounding the cylindrical exterior surface of said posts and surrounded by the rungs;
inlet passages in the T-fittings for feeding adhesive to the grooved areas;
vent passages in the T-fittings for venting from such grooved areas; and
adhesive filling said grooved areas for connecting the T-fittings to the rails and rungs.

28. A ladder section according to claim 27 in which the inlet passages to the grooved areas surrounded by the rungs include inlet ports passing through the rungs.

29. A ladder section according to claim 27 in which the T-fittings have porting rings sleeved thereon interfitting with the ends of the rungs, said porting rings having inlet and outlet ports registering with the inlet and outlet passages for the grooved areas surrounded by the rungs.

30. A T-fitting comprising:
a molded plastic body of general T-shape having a longitudinal bore for receiving a cylindrical post therethrough, and having a neck extending at a cross-angle relative to the axis of said bore for receiving a tubular member thereon;
circular grooved areas in said body interrupting said bore and the exterior surface of said neck;
inlet passages in said body arranged to feed adhesive to said grooved areas for connecting the T-fitting to such a post and tubular member; and
vent passages in the T-fitting arranged to vent said grooved areas while they are being filled with adhesive.

* * * * *

UNITED STATES PATENT AND TRADEMARK OFFICE
CERTIFICATE OF CORRECTION

PATENT NO. : 4,715,474

DATED : December 29, 1987

INVENTOR(S) : Donald T. Wehmeyer

It is certified that error appears in the above—identified patent and that said Letters Patent is hereby corrected as shown below:

In Claim 1, lines 3 and 4, please insert, following "head," and before "circumferential" the words --said neck having a--.

Signed and Sealed this

Seventeenth Day of May, 1988

Attest:

DONALD J. QUIGG

Attesting Officer

Commissioner of Patents and Trademarks